United States Patent Office 2,724,236
Patented Nov. 22, 1955

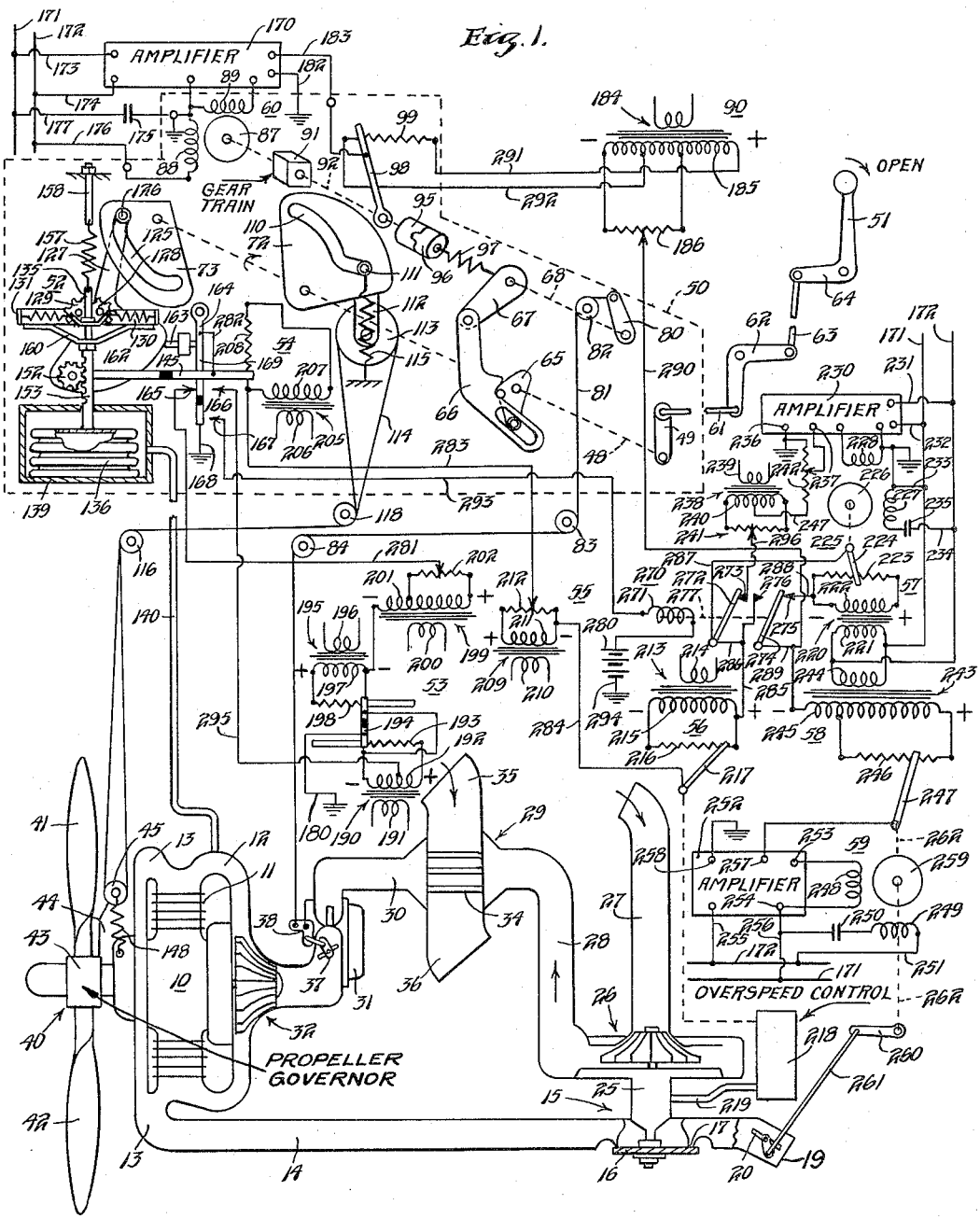

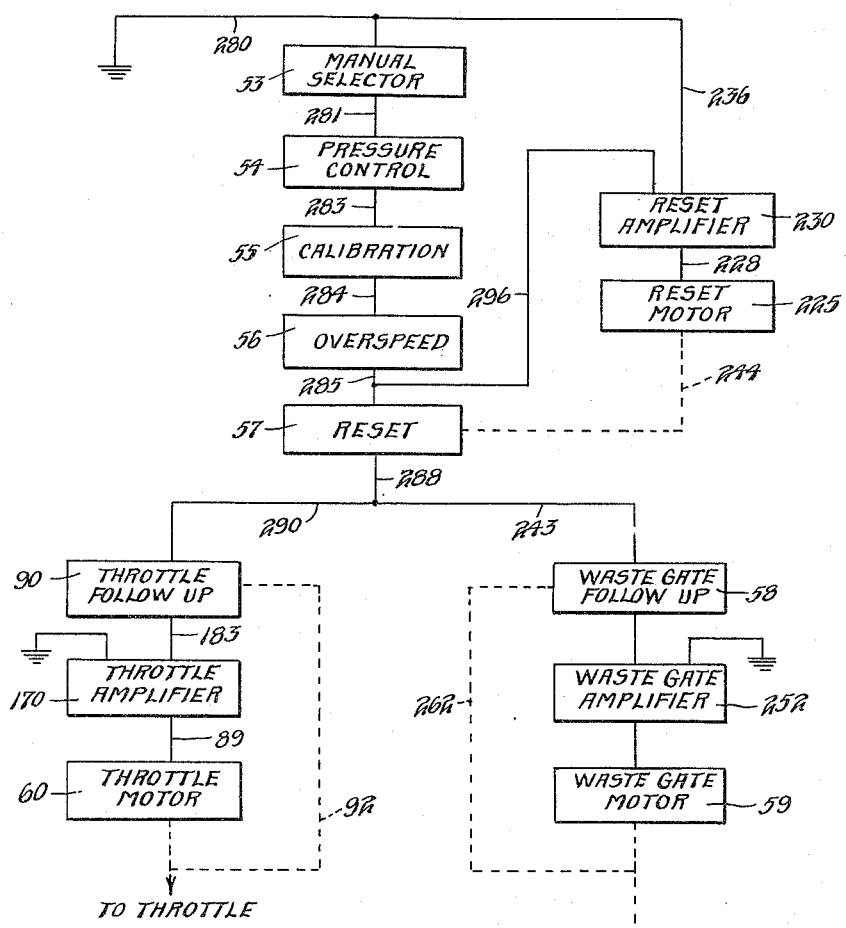
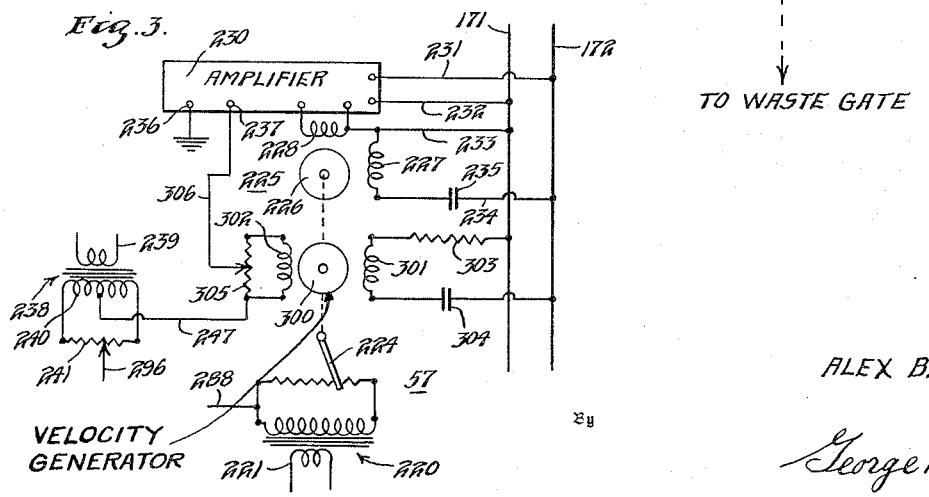

2,724,236

DEDROOPING CONTROL APPARATUS FOR A COMBUSTION ENGINE

Alex B. Chudyk, St. Louis Park, Minn., assignor to Minneapolis-Honeywell Regulator Company, Minneapolis, Minn., a corporation of Delaware Application October 27, 1947, Serial No. 782,403

14 Claims. (Cl. 60—13)

The present invention is concerned with engine control apparatus and more particularly with apparatus of the type employing electrically controlled motors for regulating the power output of an engine.

In Letters Patent No. 2,612,226 of Stephen Crum for "Engine Power Control Apparatus," issued September 30, 1952, and my Letters Patent No. 2,485,431, issued October 18, 1949, there is described apparatus for controlling the power delivered by an aircraft engine through a proportioning system in which by means of a single lever it is possible to adjust the position of the throttle, the compressing effect of a turbo supercharger, and the setting of a propeller governor controlling the speed of the propeller. The present invention is particularly concerned with the various features of the circuit connections employed in that apparatus and providing therewith additional apparatus to accomplish load compensation to eliminate the "droop" which is inherently present in the system.

Droop may be explained as the departure of the controlling condition necessary in a proportioning system to maintain a change in output arising from a change in load. In an ordinary proportioning system, the position of the output controller is always proportional to the position of the main controller and remains constant for a fixed position of the main controller or fixed value of the controlling condition. If there is a change in load, it is impossible to maintain the controlling condition at the desired value since the change in output necessary to tend to maintain the controlling condition at the desired value can only be accomplished by some change in the value of that condition.

It is therefore an object of the present invention to provide control apparatus which will respond to a deviation in pressure in an engine from the pressure setting made by manual adjustment and to feed a corrective signal to the control apparatus to compensate for that deviation.

Another object of the present invention is to provide control apparatus having load compensation apparatus, operating in cooperation therewith, with calibrating and sensitivity adjustments capable of determining the relative operation between the compensating apparatus and the control apparatus.

A further object of the present invention is to provide a control apparatus in which an electrical motor is positioned to maintain a desired pressure in an engine and adding thereto a further pressure maintaining signal set by compensation apparatus when the pressure tends to "droop" from the desired pressure setting.

A further object of the present invention is to employ a control apparatus which employs electronically controlled pressure maintaining apparatus for an engine and cooperating therewith an auxiliary electronically controlled apparatus for adjusting the main control apparatus when the pressure deviates from the desired pressure.

A still further object of the present invention is to provide a control apparatus which has a turbine overspeed sensing apparatus for introducing in the control apparatus a pressure decreasing signal upon an overspeed condition and further has load compensation apparatus which cooperates with the overspeed apparatus when the latter calls for a pressure decrease.

Still another object of the present invention is to provide power control apparatus having load compensation apparatus and switch apparatus operable to remove the load compensation apparatus whenever certain power settings are desired in the power control apparatus.

Other objects of the present invention will be apparent from the accompanying specification, claims, and drawing, of which:

Figure 1 is a schematic showing of my invention applied to power control apparatus;

Figure 2 is a block diagram showing the relation of my present invention to an engine power control apparatus; and Figure 3 shows a modification of the reset control shown in Figure 1.

Referring to the Figure 1, the reference number 10 is employed to indicate a radial aircraft engine having a plurality of radially disposed cylinders 11 each connected to an intake manifold 12 and an exhaust manifold 13. Gas from the exhaust manifold 13 is conducted through an exhaust conduit 14 to an exhaust gas turbine 15 having a turbine wheel 16. A nozzle ring 17 is adapted to discharge the exhaust gas in such a manner as to impinge the buckets of the turbine wheel 16 to cause rotation of the latter. The conduit 14 terminates in a discharge duct for outlet 19 in which is located a damper like valve 20 commonly referred to as a waste gate. As the waste gate is opened, the gases may flow past it with less resistance than presented by the turbine so that the gases are by-passed around the nozzle ring and the operating speed of the turbine is reduced. As the waste gate 20 is closed, more and more of the exhaust gas is forced through the nozzle ring 17 to increase the speed of the turbine.

The turbine 15 is connected through a gear box 25 to a supercharger 26. The supercharger is of the centrifugal type in which the extent of compression of air is varied in accordance with its speed and hence in accordance with the speed at which turbine 15 is driven. Air is drawn into the supercharger 26 through an air intake conduit 27. The compressed air is delivered through a conduit 28 to an intercooler 29. From the intercooler, the air is delivered through a carburetor intake duct 30 to a carburetor 31 where the compressed air is mixed with fuel. The air then passes through a further supercharger 32, which is driven directly by the engine 10, through the intake manifold 12 to the various cylinders.

Referring back to the intercooler 29, this comprises a means for removing the heat of compression from the air leaving the supercharger 26. The intercooler comprises a plurality of ducts 34 through which the air is passed and which are disposed in heat exchange relation with air introduced into a scoop 35 passing through a conduit 36.

The carburetor 31 is entirely conventional and consists of a throttle 37 and a bell crank arm 38 associated with the other components common to the standard carburetor.

The engine 10 drives the variable pitch propeller 40 having a plurality of blades 41 and 42. The pitch of these blades is controlled by a propeller governor 43 of conventional form. The propeller governor is provided with adjusting mechanism 44 including a pulley drum 45. A spring 148 is shown as extending between a fixed portion of the adjusting mechanism 44 and a part on the pulley drum 45 such as to bias the drum to a position at which the propeller is set to maintain a speed desirable for cruising.

The apparatus described so far sets out a typically arranged aircraft engine to which the control apparatus of my invention is applied. In general, I provide a coordinator unit 50, a complex electrical network consisting of a plurality of impedance networks including a manual selector network 53, a pressure responsive network 54, a pressure calibration network 55, an overspeed network 56, a reset network 57, and a throttle motor rebalance network 90, or a waste gate rebalance network 58. The coordinator unit 50 is adjusted manually by means of a conventional throttle lever 51, which may be positioned in the same location as the conventional aircraft throttle lever. Upon actuation of this lever, the position of the throttle is directly varied and, at the same time, the setting of a pressure responsive device 52 is varied. The pressure responsive device through the electrical network mentioned, controls the operation of a throttle motor 60 which also positions the throttle. The pressure responsive mechanism 52 also controls, through the electrical network, a waste gate motor 59 to position the waste gate 20. As will appear from the later descriptions, the throttle motor 60 and the waste gate motor 59 are sequentially operated so that the throttle is gradually moved to open position and the waste gate is thereafter moved to closed position. The movement of the lever 51 acts to vary the setting of the propeller governor adjusting mechanism 44 to maintain a propeller speed corresponding to the selected manifold pressure. The complex electrical network provides means for varying the manifold pressure for any given setting of the throttle lever 51 and for performing certain switching functions incidental to the operation of the engine. In other words, the power lever 51 acting through the coordinator 50 controls certain engine operating variables by means of changes in those variables and changes in variables related thereto. The various units of the control apparatus will now be described in more detail.

Referring to the coordinator 50, this comprises a central shaft 48 to which is secured an input crank arm 49. The crank arm 49 is connected to throttle lever 51 by rod 61, bell crank arm 62, rod 63, and an arm 64. It will be apparent that as throttle lever 51 is moved in a clockwise direction, the shaft 48 is likewise moved in a clockwise direction. The shaft 48 has secured to it a triangular crank arm 65, a propeller governor cam 72, and a pressure control cam 73. The arm 65 cooperates with a link 66 and a crank arm 67 to initiate movement of shaft 68. The propeller governor cam 72 cooperates with a roller 111, moving in a slot 110 and carried by an arm 112 to rotate arm 112 and a pulley 113 secured to the same. The pulley 113 actuates suitable cables 114 and, by way of pulleys 116 and 118, variably adjusts the propeller governor 44 in accordance with the rotation of the main shaft 48. A spring 115 cooperates with the roller 111 as it moves in slots 110. The spring 115 further cooperates with pulley 113 and cable 114 to counteract the action of spring 148 located in the propeller governor 44. The propeller governor spring 148 is provided to automatically move the pulley 45 to the cruising range of speed in the event that there is a break in the cable 114.

The pressure controller cam 73 is provided with a cam slot 125. Cooperating with this cam slot 125 is a roller 126 secured to a crank arm 127. The crank arm 127 is in turn secured to gear 128 which meshes with a second gear 129. Secured to gears 128 and 129 are spring arms 130 and 131 which serve to variably adjust the pressure maintained on a bellows stem 135 which is the control member actuated by a pressure responsive bellows 136. The bellows 136 is evacuated and sealed with a housing 139, the latter of which has a seal about the bellows stem 135 which may be a seal off bellows of negligible size to prevent atmospheric pressures from affecting the positioning of the stem 135. The intake manifold pressure is sensed through a conduit 140 which is so connected to the bellows system as to cause an upward movement of stem 135 when the pressure decreases. Acting with arms 130 and 131 in one range of values or positions is a leaf spring 160. Meshed with gear 152 is the gearing or gear rack 153 on the stem 135. Connected to gear 152 is a potentiometer wiper 145 and a cam 162 which in turn cooperates with a slidable pin 163 to actuate a switch arm 164 whenever cam 162 has been rotated by gearing 152 to a certain position. Bellows stem 135 is further acted upon by a biasing spring 157 supported by a rod 158. All of the above apparatus with the exception of the pressure controller 52 are described in detail in the patent of Stephen Crum mentioned above. The details of the adjusting mechanism of the pressure controller 52 are fully described and claimed in Letters Patent of Stephen Crum No. 2,485,433, issued October 18, 1949. For a more detailed understanding of the operation and construction of the coordinator mechanism and of the pressure controller 52, reference is made to the aforementioned patents. This apparatus is, however, shown schematically in sufficient detail in the present application for a complete understanding of my invention.

The shaft 68 is positioned by either the link arm 67 directly or indirectly by the throttle motor 60 acting through a gear train 91, shaft 92, and a strain release mechanism 95, 96 and 97. Any rotation of the shaft 68 results in the repositioning of throttle 37 by way of cable 81, pulleys 82, 83, and 84, and crank arm 38. Fastened to the throttle motor shaft 92 is a rebalance slider arm 98 which cooperates with a slide wire resistor 99 in a manner to be described later.

Controlling the position of the throttle motor 60 are the energizing windings 88 and 89 which position the rotor 87. Winding 88 is energized by input line wires 171 and 172 through conductors 176 and 177 and a phase shifting condenser 175. A throttle motor amplifier 170, energized from input power lines 171 and 172 through conductors 173 and 174, acts to energize the other motor winding 89.

The phase shifting condenser 175 which is in the energizing circuit for motor winding 88 introduces a constant voltage phase shift in the motor winding that is always 90 electrical degrees displaced from the line voltage. The voltage on the winding 89, if there be any, will be either in phase or 180 electrical degrees out of phase with respect to the line voltage. With these two voltages available for motor windings 88 and 89, two directional movements of rotor 87 is possible since the two windings will be acting 90 electrical degrees apart and the phase of the amplifier output will determine the direction of rotor rotation as the voltage on the amplifier output will be leading or lagging the fixed voltage on the winding energized through condenser 175. The phase of the input to amplifier 170 is determined by the balance of the input electrical network as will be described hereinafter. The throttle rebalancing network 90 consists of a primary 184 energized by a common power source, a secondary 185, a rebalance potentiometer consisting of slider 98, a slide wire 99 forming a follow-up controller, and a cruise calibration potentiometer 186.

The manual selector electrical network 53 consists of a transformer 190 having a primary 191, connected to line wires 171 and 172 by a suitable connection not shown, a secondary 192 and a slide wire resistor 193 forming an emergency power network, a manual slider 194, a further transformer 195 having a primary 196, connected to a common source alternating current power, and a secondary 197 with a further suitable slide wire resistor 198 connected thereto. A still further portion of network 53 consists of the transformer 199 which has a primary winding 200, connected to the common power source, a secondary 201 and a potentiometer 202 associated with the secondary winding. The network 54 consists of a power transformer 205 having a primary winding 206 connected to the common power source, a secondary 207 with a slide wire resistance 208 connected thereto forming a signal controller, the slide wire resistance 208 being associated with the slider 145 of the pressure controller 52. The network 55 consists of a power transformer 209 having a primary winding 210, connected to the common power source, and a secondary winding 211 with a potentiometer 212 connected thereto.

The overspeed control network 56 consists of a transformer 213 having a primary winding 214, connected to the common power source, and a secondary winding 215 with a slide wire resistance 216 connected thereto. The slider 217 is associated with the slide wire resistance 216 and is positioned by the overspeed control 218 which in turn is connected to gear box 25 by coupling means 219.

Reset network 57 consists of a power transformer 220 having a primary 221 connected to input power lines 171 and 172, and a secondary winding 222 with a slide wire resistor 223 associated therewith. A reset slider 224 is positioned by a reset motor 225 which consists of a rotor 226 and energizing windings 227 and 228. As in the case of the throttle motor 60, the energizing windings 227 and 228 are spaced 90 electrical degrees apart to make possible reversible action of the motor. Amplifier 230, which energizes winding 228, is connected to input power lines 171 and 172 by means of conductors 231 and 232 and has an output phase that is either in phase or 180 degrees out of phase with the line voltage. Winding 227 is energized directly from input power lines 171 and 172 through conductors 233, 234 and condenser 235 the latter of which serves to shift the voltage on the winding 227, 90 electrical degrees with respect to the line voltage. The input to amplifier 230 comes from a calibration network consisting of a power transformer 238 having a primary winding 239 connected to a suitable power source, not shown, a secondary 240, and a calibration potentiometer 241. A sensitivity adjustment 242 is also provided in the input to amplifier 230 and consists of a potentiometer connected directly to the input terminals 236 and 237.

The waste gate rebalance network 58 consists of a power transformer 243 having a primary winding 244 connected directly to input power lines 171 and 172, a secondary winding 245, and a slide wire resistor 246 connected to the secondary winding. A rebalancing slider 247 is connected to the waste gate motor 59 and is associated with the slide wire resistor 246. Waste gate motor 59, like throttle motor 60 has a pair of energizing windings 248 and 249 which are spaced 90 electrical degrees apart to make possible the reversing of a rotor 259. The winding 249 is energized directly from the input power lines 171 and 172 by conductors 251, 256, and condenser 250. The energizing winding 248 is energized by the amplifier 252 and is connected directly to the output terminals 253 and 254 of the amplifier. The amplifier is energized by the input power lines 171 and 172 by conductors 256 and 255. The signal from the electrical network fed in on terminals 257 and 258 of amplifier 252 acts to determine the phase energization of winding 248 and therefore the rotation of the rotor 259. When rotor 259 rotates, the shaft 262 connected therewith causes rotation of the crank 260 and the rod 261 will position the waste gate 20 according to the rotation of the rotor 259.

A reset cutout relay 270 consists of a relay winding 271 which when energized by a battery 280 causes armature 277 to actuate a pair of switch arms 272 and 274. The switch arm 272 is normally biased, by means not shown, in a manner so as to be in contact with a contact 273 and arm 274 is normally biased by means, not shown, into engagement with a contact 275. Upon energization of the relay winding 271, the switch arm 274 moves into engagement with a contact 276.

*Operation of electrical network*

The operation of the electrical network can be best understood by first assuming that all the network transformer primaries are connected to a common alternating current source in such a manner that the respective secondaries are of the phase polarity as shown on the drawing. Since the network determines what the input to the various amplifiers is to be and what the resultant rotation of the respective motors is to be, it is important to understand that the input to each amplifier is the algebraic sum of the voltages of the network common to that amplifier.

The throttle motor amplifier signal comes from the algebraic sum of the voltages of networks 53, 54, 55, 56, 57, and 90, as shown in Figure 2 in block diagram form. This will be evident when the voltages of each individual network in Figure 1 are considered with the sliders in the position illustrated. The voltages for the network 53 will, when measured from the ground 280 to the conductor 281, be positive. The voltages between the conductor 281 and the conductor 283, which are the terminals for pressure control network 54, will be slightly negative. The voltage across network 55 when measured between the conductors 283 and 284 will also be negative. Since the overspeed control network 56 is generally not in operation, it may be assumed that at present there will be no voltage between conductors 284 and 285 which are across the overspeed network 56. The voltage due to the reset network 57 will be measured between the conductors 285 and 288 and this voltage will be slightly negative. The voltage across the network 90 is measured between the conductor 290 and the slider 98 and this voltage will generally be positive. Under a balanced condition, the positive voltage added from the networks 53 and 90, will have the same magnitude but opposite polarity of the voltages on networks 54, 55, and 57. With a change in position of the manual controller 194 in network 53 there will be a resultant change on the input terminals 183 and 182 of the throttle amplifier 170. The throttle amplifier will cause rotation of the throttle motor 60 which in turn will reposition the wiper 98 of the rebalance potentiometer. Since a rotation of the throttle motor also causes a resultant change in the position of the throttle 37 there will be a change in the manifold pressure which when sensed through conduit 140 will actuate the bellows 136 and cause the pressure controller wiper 145 to assume a new position upon its associated slide wire resistor 208 in network 54. This is due to the expansion or contraction of the bellows 136 and the resultant repositioning of the stem 135. A positive addition of voltage in network 53 will result in network 54 assuming a more negative potential and network 90 a less positive potential so that the algebraic sum will still add up to zero and the network will be at a new point of balance.

The signal which causes the positioning of the waste gate motor 59 arises from manual control network 53, pressure controller network 54, calibration network 55, overspeed network 56, reset network 57, and waste gate rebalance network 58, as may be seen in Figure 2. As was the case of the throttle motor amplifier, the waste gate amplifier 252 will have no voltage on its input when there is a balanced condition in the electrical network or when, with the elements in the positions shown in the drawing, the positive voltages due to networks 53 and 58 equal the negative voltages due to networks 54, 55, and 57.

The signal controlling the reset motor amplifier 230 originates from the manual control network 53, pressure control network 54, calibration network 55, and overspeed network 56 as also may be seen in Figure 2. The reset calibration network consisting of transformer 238 and potentiometer 241 also acts as a part of the input network to amplifier 230. Whenever there is an unbalance between the electrical networks making up the input control network for the amplifier 230 there will be a rotation of the reset motor 225 and a repositioning of the wiper 224 on the slide wire resistor 223 of the reset network 57. This network differs from the previous two discussed in that the rebalancing of the network controlling the reset amplifier is not accomplished directly by the rotation of the reset motor but indirectly due to the change in pressure resulting from the unbalance caused by the reset network 57 and the ultimate repositioning of either throttle motor 60 or the waste gate motor 59. This operation will be more fully described in connection with the overall operation of my control apparatus.

In noting the fact that the control networks for either the throttle motor or waste gate motor are balanceable networks it will be understood that movement of any or all of the various control or calibration potentiometers will cause a resultant repositioning of the motor associated with that particular branch. For example, movement of the manual control slider 194 toward the left results in there being a less positive voltage being introduced into the main network from the control network 53. To compensate for this unbalance, the throttle motor will have to move the slider 98 of the throttle follow up network 90 in a throttle closing direction or the left. Similarly, movement of the tap of potentiometer 202 toward the left results in there being a less positive voltage introduced and will also cause an unbalance which will move the throttle motor in a throttle closing direction. The potentiometer 202 is actually provided for calibrating the manifold pressure of the engine. Slider 145 of the pressure responsive network 54 is moved in an upward direction upon a decrease in manifold pressure. This movement results in a more negative signal appearing in the control network to cause movement of the throttle motor 60 in a throttle opening direction. An increase in manifold pressure would result in the opposite action. Calibration potentiometer 212 of the network 55 is provided for calibration of the network when throttle lever 51 is in the military power on takeoff position. Movement of the slider of this potentiometer toward the left results in there being introduced a more negative signal in the control circuit which will operate to position throttle motor 60 in a throttle opening direction.

Overspeed network 56 is normally ineffective to introduce a controlling signal in the control network. However, when there is an overspeed condition at the turbine 16, the slider 217 will move to the left across the slide wire 216 and introduce in the control network a positive voltage which will result in a waste gate opening movement of motor 59. The overspeed network will never have any effect on the throttle for the waste gate remains in open position until the throttle approaches full open position, so that the turbine 16 will not be effectively rotating until the throttle is nearly open.

Reset network 57 is effective to cause a throttle closing signal to be introduced into the control network whenever the slider 224 moves to the left across the slide wire 223.

Potentiometer 186 of network 99 is provided for varying the relative position between the throttle and waste gate for any given setting of the other controls. If the potentiometer slider is moved toward the left, a positive voltage will be introduced into the throttle motor control network which will result in a throttle closing signal. It should be noted that this potentiometer serves only to position the throttle motor with respect to the waste gate motor and actually has no effect on the positioning of the waste gate.

The operation of the entire control apparatus will be considered next. Upon starting of the engine, it is first necessary to move the throttle slightly open. This is done by moving the throttle lever 51 toward the right, which movement is transferred directly to the throttle 37. This may be seen since the throttle lever 51 is connected to the linkage consisting of components 49, 61, 62, 63, and 64, to the main control shaft 48 and from the control shaft 48 through the linkage consisting of cam 65, link 66, and arm 67 to the throttle shaft 68 which in turn causes rotation of the arm 80 and the actuation of the cable 81 connected directly to the throttle crank arm 38. As pointed out previously, the rotation of the main control shaft 48 also results in the rotation of the cams 72 and 73. The rotation of cam 72 puts in a desired setting in the propeller governor control for that particular throttle opening movement. The rotation of cam 73 adjusts the tension applied to the stem 135 associated with the pressure controller 52. With the setting of the throttle and the pressure controller set, the manual control slider 194 moved to the desired position, and the engine running, the throttle motor 60 will be positioned according to the unbalance of its electrical network. The unbalance will cause the throttle motor to reposition the throttle so that the throttle position will fully agree with that setting determined by the tension set on the pressure controller 52 or the network 54 and the manual control 194 of the network 53. The waste gate motor will not operate on any unbalance until such time as the throttle motor has reached the wide open or near wide open position. This is due to the fact that the electrical network is so balanced that the signal on the waste gate motor calls for an open waste gate until the throttle motor has driven the throttle near open position.

Upon the warming up of the engine, the ship is ready for take-off. The slider 194 is positioned in the normal position substantially as shown in the diagram. The throttle lever 51 is then moved to the extreme right hand position, which may be referred to as the military power or take-off position. Such movement results in sufficient manual clockwise rotation of the shaft 68 to cause the throttle to be moved to its wide open position. The propeller governor is also rotated to a point at which roller 111 is at the end of the cam slot 110 opposite to that in which it is shown in the drawing and at this setting the propeller governor calls for take-off speed.

The movement of the throttle lever 51 to its extreme right hand position also causes the pressure controller cam 73 to be rotated to a position in which the roller 126 is at the extreme end of slot 125 opposite to that in which it is shown. This brings the spring arms 131 and 132 to a position in which they extend substantially vertically so that there is a maximum effort exerted upon the stem 135. The rotation of the crank arm 127 by the cam 73 also results in the cam 162 being rotated to a position in which the pin 163 is moved to the right by the cam to cause the switch arm 164 to move from engagement with contact 165 into engagement with contact 166. Segment 169 of the switch arm 164 also moves into engagement with contact 167. The effect of this switch is to transfer the control signal from the normally used portion of the network 53 to a different section of network 53. When the segment 169 moves into engagement with the contact 167, the relay 270 is energized and the reset network 57 is switched from the control network and the input to the reset amplifier is broken. The energizing circuit for relay 270 may be traced from the positive terminal of the battery 280 to the relay winding 271, conductor 293, switch contact 167, segment 169, and ground connection 168 back to ground 294 of the battery 280. When the relay 270 is energized the switch arm 272 moves out of engagement with switch contact 273 and thereby opens the input circuit to the reset amplifier 230 and the switch arm 274 moves out of engagement with contact 275 and into engagement with contact 276. This latter switching effectively cuts the reset control network 57 out of the electrical network. The control circuit that is controlling the input signal to the throttle motor amplifier 170 may be traced from the ground terminal 180 of the manual control network 53 through the manual controller 194, the left hand terminal of secondary 192, the left hand portion of secondary winding 192, conductor 295, switch contact 166, arm 164, conductor 282, pressure responsive network 54, conductor 283, calibration network 55, conductor 284, overspeed network 56, conductor 285, switch contact 276, switch arm 274, conductor 289, potentiometer 186, rebalance potentiometer slider 98 to the input terminal 183 of the amplifier 170. The signal to the waste gate motor amplifier follows the same line as the throttle motor signal from ground 180 of the manual control network 53 through to conductor 285 and contact 276 of relay 270 where the signal branches and goes through switch blade 274 and conductor 289 to the waste gate follow up network 58 which has its slider 247 connected directly to the input of amplifier 252. It will be noted that the circuit just traced eliminated the main control networks of the manual control network 53 and instead included a fixed potential taken from the transformer 190. The voltage from the secondary winding 192 is that voltage which will establish the normally desired manifold pressure and it is desirable to have this pressure selected independently of the manual control selector and its calibrator in the event that there is some faulty adjustment in these networks that may result in inadequate or excessive power during take-off conditions or at other times when military power is needed. The reset network 57 is removed from the network for the same reason just mentioned in connection with the manual control network 53.

Thus, by the provision of the military power switch 164, and the switch connections associated therewith, the power during take-off is determined entirely by the throttle 51 except for the overspeed controller, calibration potentiometer network 55, and the cruise calibrator potentiometer 186. The manual control slider 194, while actually in the control circuit, does not normally have any controlling effect since it is moved into engagement with slide wire 193 only when an emergency exists. The cruised calibrator potentiometer 186 only controls the relative position of the throttle with respect to the waste gate. Under these conditions, the throttle is wide open regardless of how the cruise calibrator potentiometer is set. The overspeed potentiometer is operated only when an overspeed condition exists and is necessary. Thus, the power supplied to the engine in this range is subject to rather close control by the throttle lever 51. In the event that there is an emergency and slider 194 is moved into the emergency range on slide wire 193, the manifold pressure is further increased in accordance with the position of the slider 194. This will be true even though the throttle is in the military power position.

When the airplane has reached the desired altitude, the throttle lever 51 is retarded to an intermediate position within the cruising range. Under these conditions, it is desirable that the slider 194 be in the approximate position shown on the diagram. The position to which the shaft 48 and the throttle crank arm 80 are manually moved is an intermediate position. At any appreciable altitude, however, in order to maintain the pressure demanded by the pressure responsive controller 52 under these conditions, the throttle motor will have been affected to drive the throttle to wide open position and, in all likelihood, the waste gate motor 59 will have been affected to drive the waste gate partly to closed position. When the throttle lever is retarded to the intermediate position, the reset network 57 is switched back into the main control network and the input to the reset amplifier 230 is again closed. This was because the arm 164 was allowed to move back into engagement with contact 165. The input to the reset amplifier 230 may be traced from the ground terminal 180 of the manual control network 53 through the conductor 281, switch contact 165, switch arm 164, conductor 282, pressure responsive network 54, conductor 283, calibration network 55, conductor 284, overspeed network 56, conductor 285, conductor 286, switch arm 272, switch contact 273, conductor 296, reset calibration potentiometer 241, secondary 240, conductor 297, and sensitivity potentiometer 242 to the input terminals 236 and 237. It will be noted that the circuit to the reset motor includes all of the networks normally common to the network circuits for the waste gate and throttle amplifiers.

Since in any proportional follow up system there is an inherent condition known as "droop," it is necessary for the closest of control to provide means for correcting said "droop" condition. As explained above, this condition results in the normal proportional system from the fact that to maintain a condition, the condition responsive mechanism must be unbalanced or displaced an increasing amount dependent upon the increased demand or the increase in the load or input conditions.

In the present apparatus, the condition being controlled is manifold pressure. As the pressure begins to drop for a given setting of the pressure controller by the throttle, it is necessary for the slider 145 to indicate that drop in the network and introduce a signal which will cause the pressure to be increased by further opening the throttle or closing the waste gate. If the plane is going to a higher altitude, it will be necessary, to keep the desired pressure, to maintain the throttle at a further open position. Since the pressure controller is the only device sensing the pressure, it must of necessity lag behind or "droop" from the actual pressure desired to maintain the new setting of the throttle or the waste gate. To compensate for this "droop" or lagging of the pressure sensitive device behind the desired pressure, a reset mechanism is provided for introducing a corrective signal into the electrical network whenever the pressure deviates from the desired. This is done in the present apparatus by the reset network 57, acting through slider 224 to variably correct the voltage to the main control network when the above mentioned deviation occurs.

As pointed out above, the voltage applied to the input terminals 236 and 237 of amplifier 230 is derived from the algebraic sum of the voltages on the networks 53, 54, 55, and 56, as shown in Figure 2, as well as the voltage due to the calibration potentiometer 241. It will be obvious, that when there is an unbalance on the input terminals 236 and 237 of the reset amplifier 230, that reset motor 225 will rotate and will reposition the slider 224. The slider 224 is moved quite slowly in the actual installation by motor 225 as long as there is an unbalance on the input terminals of the amplifier 230.

Assume the plane is flying at a fairly high altitude so that the throttle is full open or the throttle motor is as far advanced in the open direction as possible and the waste gate is partially closed. The signal on the input terminals of the throttle motor will be calling for a further throttle opening signal and the signal on the waste gate will be balanced so that there will be no change in the waste gate position. Assume further that the reset motor is not running, or the manifold pressure of the plane is at the desired value.

Under such conditions, the algebraic sum of the voltages applied to the throttle amplifier input terminals will be minus. This can be seen by adding the plus voltage of the network 53, the minus voltage of the network 54, the minus voltage of the network 55, the minus voltage of the network 57 and the plus voltage of the network 90. That signal will be sufficiently negative that the positioning of the slider 98 of the network 90 when moved to its extreme right position cannot add enough plus voltage signal to balance the network and so the throttle will be maintained in the full open position. The signal to the waste gate will be similar except that at the rebalance network 58, there is added a fixed plus voltage sufficient to maintain the waste gate amplifier in a different range so that the input network to the amplifier can be balanced by the rebalance wiper 247 driven by the waste gate rotor 259. As assumed above, the reset amplifier input signal will be balanced and may be arrived at by adding the plus voltage of the manual control network 53, the minus voltage from the pressure controller network 54, the minus voltage from the calibration network 55, and a plus voltage due to the calibration network potentiometer 241.

Assume now that the plane goes to a higher altitude so that, to maintain the same manifold pressure, it will be necessary for the waste gate to close and cause an increase in speed of the compressor 26 which in turn will compress more air and there will be more air supplied to the input manifold to maintain the same pressure. As the plane rises, the pressure drop will be sensed by the bellows 136 which, when acting through the stem 135, the pinion and rack 152 and 153, and arm 145, will put a more negative signal in the control network. This negative signal will cause a repositioning of the waste gate 20 and as it is repositioned by the rotor 259, the slider 247 associated with the rebalancing network 58 will take up a new position to create a balanced condition in the waste gate control network. As pointed out above, when the pressure decreased due to the climb in altitude, in the normal system, the pressure device has to maintain a new setting to try and keep the manifold pressure close to that desired and to maintain the waste gate in a pressure increasing position. As the polarities of the network have been discussed thus far, this voltage, when the pressure drops due to the new position taken by the slider 145 of the pressure device 52, will be more negative than before. The waste gate amplifier acts only to seek a rebalance position of the total network affecting it; it will not introduce a corrective signal in the network to compensate for that added negative signal introduced by the deviation of the pressure controller from the desired pressure setting. With the reset of the apparatus in operation, the reset amplifier will sense this deviation and will operate the reset motor 225 and the slider 224 to add a signal in the control network that will cause the further closing of the waste gate to bring the pressure up to the value actually desired. Thus this signal will be such as to oppose the tendency of the waste gate follow-up to balance the network and will force the waste gate follow-up to be further adjusted to cause the pressure to become that actually selected. When the pressure desired has been reached, the pressure controller will be at the same setting it was before the assumed change in altitude took place and the reset slider will be at a new position which effectively takes up the "droop" formerly present at the pressure controller. Thus the pressure controller will bring the reset amplifier input back to balance since the pressure controller is normally the only variable affecting the balance of the reset amplifier input. The net over-all network effect is that the reset signal takes the place of the pressure deviation signal which is normally causing a drooping of the system or the tendency of the pressure to lag behind that actually desired. Since the reset signal takes the place of the pressure deviation signal, it must inherently be in opposition to the follow-up signal and in aiding relation to the pressure signal.

The sensitivity potentiometer 242 serves to control the response the reset amplifier will have to the deviations of the pressure controller from the desired setting. The calibration potentiometer 241 selects the amount of and polarity of the voltage that must be added to the reset amplifier input network to maintain that input balanced at a certain pressure setting determined by the manual control network 53 and the pressure control network 54.

The function of the apparatus is the same regardless of whether there is an increase or decrease in altitude at which the plane is flying. The droop characteristic on a decrease in altitude of the plane or a decrease in the load has the effect of causing the intake manifold pressure to be too high rather than too low as when there is an increase in load. It will be noted that while my control apparatus functions with changes in load resulting from changes in altitude, it is not affected by atmospheric pressures directly but serves to maintain the desired absolute pressure set solely by the manual controls of the apparatus. Further, the droop characteristics being present on a load increase or load decrease are compensated for by the reset amplifier and motor by readjusting the slider 224 in amounts equal to that necessary to remove the droop or an amount corresponding to the deviation of the pressure controller from the desired value.

As yet, no consideration has been given to the overspeed control network 56. In the normal installation, the overspeed control network serves to introduce a pressure decreasing signal to the control network to prevent the overspeeding of the driving turbine and compressor. Normally there is no voltage introduced into the control network by network 56 because the slider 217 is on the right end of the slide wire resistor 216 and the control network conductor 285 is also connected to the right hand end of the slide wire 216. However, when an overspeed condition exists and the slider 127 moves across the slide wire 216, there is introduced into the network a positive voltage which will call for a waste gate opening signal to prevent the overspeed of the turbine. With the overspeed control network 56 present in the control system it is highly necessary to locate the reset control network so that it will cooperate with the signal supplied from the overspeed controller and will not try to feed into the control network a signal compensating the signal initiated by the overspeed controller. That is why the reset amplifier input signal is derived from networks 53, 54, 55 and 56, the latter being the overspeed controller network. This results in the reset amplifier further adding a waste gate opening signal when the overspeed controller introduces a positive or waste gate opening signal in the network. Were it otherwise, the reset network would try to introduce a signal in the control network which would compensate for the pressure drop introduced by the overspeed control network.

In Figure 3, I have disclosed a slight modification of my control apparatus as relates to the reset portion of the control. Components which are similar to those of Figure 1, carry the same reference numerals. In the modification I have added a generator 300 of the type known as a velocity generator. This velocity generator is driven by the reset motor 225 and is directly coupled to the rotor 226. The generator 300 has two field windings, 301 and 302. Winding 301 is continuously energized by connections to the input power lines 171 and 172 through a limiting resistor 303 and a phase shifting condenser 304. Winding 302 is directly connected to a velocity potentiometer 305, the tap of which is connected to the input amplifier terminal 237 by a conductor 306.

In operation, the velocity generator 300 functions as a variable transformer coupler whose efficiency of coupling is a function of the angular velocity of the generator. When the generator 300 is not rotating, the energized field winding 301 will not be coupled to the field winding 302 so that no voltage will appear on velocity potentiometer 305. When the generator is rotating the field about the winding 301 will become distorted and will be coupled to the winding 302 to induce therein a voltage proportional to the velocity of the generator until the generator has reached a predetermined velocity at which there will be no further increase in voltage induced in the winding 302.

The addition of a velocity generator in the reset network gives added stability to the reset network and prevents hunting conditions from occurring should there be any sudden surges in the power demand due to throttle rams or other changes made in the load demand of the engine. This will be understood when it is considered that without a velocity generator when the reset motor is operative due to an unbalance between the pressure controller and the manual selector, there may be a tendency for the reset motor to overshoot the balance point and cause a hunting of either the waste gate motor or the throttle motor. By connecting the velocity generator 300 to the rotor 226, when rotor 226 is rotating, the field winding 302 will have a velocity signal introduced therein. This velocity signal will be of the same frequency as the input power source and will be phased 180° from the input signal that is causing the reset amplifier to drive the motor 225. The control network for the reset amplifier in the modified circuit includes the calibration potentiometer 241 and the velocity potentiometer 305 connected in series to the input terminals of amplifier 230. The magnitude of the velocity signal is generally less than the input control signal so that it will not appreciably affect the input signal even though it is 180° out of phase with it. As the control network effecting the reset amplifier begins to approach the balanced condition the input signal will become less and less but due to the inertia of the rotor of the reset motor the speed of the velocity generator will remain nearly constant and the velocity signal voltage induced in the winding 302 will remain constant. When the input control voltage becomes equal to the velocity signal on potentiometer 305 there will no longer be any input to amplifier 230 and the motor speed drops off since there is no longer any voltage on winding 228. With the drop in motor speed the velocity generator signal will decrease and the input signal will again move the motor toward the balanced position which will mean that the input signal will again become smaller and the velocity signal will once again equal the input signal and the speed of the motor will drop off. Thus, by a number of steps, the motor 225 is brought to rest at its balanced position without overshooting the balance point and there will be no hunting condition introduced into the control network. The use of the velocity generator gives an effective speed modulation by which it is possible to provide a faster operating reset motor to eliminate "droop" without danger of hunting and unstable operation. It may also be noted that the sensitivity potentiometer 242 of the arrangement shown in Figure 1 is not required in the modification shown in Figure 3 since the velocity generator eliminates the effect of too large a signal causing the motor to overshoot.

While I have discussed the operation of the reset network in particular with the rebalancing of the waste gate motor it is to be understood that it is equally effective in repositioning the throttle motor when the throttle motor is in the range in which it is possible to rebalance the same.

It may therefore be seen that I have provided a control apparatus which compensates for any "droop" characteristics present in a complex electrical network associated with a proportioning system. Also that I have provided a reset mechanism that cooperates with an overspeed control apparatus for repositioning a motor in a limiting function to aid the correction introduced by the overspeed apparatus. Furthermore, it will be seen that I have provided novel means for rendering inoperative the reset mechanism whenever a certain power setting is desired from the engine. Furthermore, while I have shown a specific form of electrical networks and engine control apparatus, it will be understood that this also is for illustrative purposes only and that the invention is to be limited solely by the scope of the appended claims.

I claim as my invention:

1. In engine control apparatus; an actuator for positioning a power regulating device and means for controlling said actuator; said actuator controlling means comprising; a signal controller, a reset controller, and a follow-up controller, each of said controllers having a control member adjustable in either direction from a normal position; means including said signal, said reset and said follow-up controllers for producing a resultant control effect the magnitude and sense of which varies in accordance with the algebraic sum of the amounts and directions of movements of each of said control members from their normal positions; means responsive to the sense and magnitude of said resultant control effect for controlling the extent and direction of movement of said actuator in accordance with the magnitude of and the sense of said resultant control effect; a main controller adapted to respond to a pressure related to the power supplied for positioning the control member of said signal controller to affect the magnitude and sense of said resultant control effect in accordance with the extent and direction of said pressure from a selected value; means responsive to movement of said actuator for positioning the control member of said follow-up controller in a direction to reduce the magnitude of said resultant control effect so that the said actuator tends to adjust the power regulating device to restore said condition to the selected value; a slow operating motor means for positioning the control member of said reset controller; and means responsive to the control effect of said signal controller but unaffected by said reset and follow-up controllers for controlling the direction of operation of said slow operating motor means so that the latter slowly adjusts the control member of said reset controller in a direction to oppose the effect of said signal controller.

2. In engine control apparatus; motor means for positioning a power regulating device and means for controlling said motor means; said motor controlling means comprising; a signal voltage controller, a reset voltage controller, and a follow-up voltage controller, each of said voltage controllers having a control member adjustable in either direction from a normal position; means including said signal, said reset and said follow-up voltage controllers and including connections to a source of power for producing a resultant voltage the magnitude and sense of which varies in accordance with the algebraic sum of the amounts and directions of movements of said control members from their normal positions; means responsive to the sense and magnitude of said resultant voltage for controlling the extent and direction of movement of said motor means in accordance with the magnitude of and the sense of said voltage with respect to the power source; a main controller adapted to respond to a pressure related to the power supplied for positioning the control member of said signal voltage controller to affect the magnitude and sense of said resultant voltage in accordance with the extent and direction of said pressure from a selected value; means responsive to movement of said motor means for positioning the control member of said follow-up voltage controller in a direction to reduce the magnitude of said resultant voltage so that the motor means tends to adjust the power regulating device to restore said condition to the selected value; a slow operating motor means for positioning the control member of said reset controller; and means responsive to the voltage changing effect of said signal voltage controller but unaffected by said reset and follow-up voltage controllers for controlling the direction of operation of said slow operating motor means so that the latter slowly adjusts the control member of said reset controller in a direction to oppose the effect of said signal voltage controller.

3. Electrical control apparatus comprising; a main signal controller, means responsive to a condition to be controlled to adjust said main signal controller to produce a control signal, a plurality of reversible motors each adapted to operate a different control device affecting the condition, a separate follow-up device connected to each motor to produce a follow-up signal opposing the control signal, a reset signal device for producing a reset signal also opposing the control signal, control means for each of said motors connected to the main signal controller, the reset signal device, and the follow-up device associated with that motor so that said motors are each controlled in accordance with the relative values of the control signal, the reset signal, and the follow-up signal for that motor, slow operating motor means for adjusting the reset signal device, and means for controlling the operation of said slow operating motor means in accordance with the value of said control signal but independently of said reset signal and said follow-up signals.

4. An electric control system comprising a signal circuit, means responsive to a condition to be controlled to produce a signal voltage in the circuit, a reversible motor adapted to operate a control device affecting the condition, a first variable voltage device connected to the motor to be controlled thereby and connected to the signal circuit, means responsive to the voltage in the signal circuit including the voltage from said first variable voltage device to control the motor, a second variable voltage device connected to the signal circuit in voltage opposition to the first variable voltage device, and means responsive to the voltage in the signal circuit exclusive of the voltage from said first variable voltage device to control the second variable voltage device.

5. An electric control system comprising a signal circuit, means responsive to a condition to be controlled to produce a signal voltage in the circuit, a reversible motor adapted to operate a control device affecting the condition, a first variable voltage device connected to the motor to be controlled thereby and connected to the signal circuit, means responsive to the voltage in the signal circuit including the voltage from said first variable voltage device to control the motor, a second variable voltage device connected to the signal circuit in voltage opposition to the first variable voltage device a second reversible motor connected to the second variable voltage device to control it, and means responsive to the voltage in the circuit exclusive of the voltage from said first variable voltage device to control the second reversible motor.

6. An electric control system comprising a pair of sources of alternating voltage connected in phase opposition, one of which is variable in response to a condition to be controlled and the other which determines the set point of the system, a reversible motor adapted to be connected to a control device affecting the system, a control circuit for the motor connected to said sources to control the direction and extent of operation of the motor in accordance with the phase and amplitude of the resulting voltage from the sources, a variable alternating voltage device connected to the motor to be controlled thereby and connected in the control circuit, a second reversible motor, a control circuit for the second motor connected to the first named control circuit to control the direction and extent of movement of the second motor in accordance with the phase and amplitude of the voltage in the control circuit, a second variable alternating voltage device connected to the second motor to be controlled thereby, and a circuit connecting the second variable voltage device to the first named control circuit in phase opposition to the first named variable voltage device.

7. An electric control system comprising a signal circuit, means responsive to a condition to be controlled to produce a signal voltage in the circuit, a reversible motor adapted to operate a control device affecting the condition, a variable voltage device connected to the motor to be controlled thereby and connected to the signal circuit, means responsive to the voltage in the signal circuit to control the motor, a second variable voltage device connected to the signal circuit in voltage opposition to the first variable voltage device, a second reversible motor connected to the second variable voltage device to control it, means responsive to the voltage in the circuit to control the second reversible motor, and a generator driven by one of said motors and connected to the control means for the respective motor in voltage opposition to the voltage in the circuit.

8. An electric control system comprising a pair of sources of alternating voltage connected in phase opposition, one of which is variable in response to a condition to be controlled and the other which determines the set point of the system, a reversible motor adapted to be connected to a control device affecting the system, a control circuit for the motor connected to said sources to control the direction and extent of operation of the motor in accordance with the phase and amplitude of the resulting voltage from the sources, a variable alternating voltage device connected to the motor to be controlled thereby and connected in the control circuit, a second reversible motor, a control circuit for the second motor connected to the first named control circuit to control the direction and extent of movement of the second motor in accordance with the phase and amplitude of the voltage in the control circuit, a second variable alternating voltage device connected to the second motor to be controlled thereby, a circuit connecting the second variable voltage device to the first named control circuit in phase opposition to the first named variable voltage device, and an alternating current generator driven by one of said motors and connected to the motor control circuit for said one motor in phase opposition to the control voltages in said circuit.

9. Electrical control apparatus comprising a signal circuit, means responsive to a condition to be controlled to produce a signal voltage in the circuit, a reversible motor adapted to operate a control device affecting the condition, a variable voltage device connected to the motor to be controlled thereby and connected to the signal circuit, means responsive to a voltage which is the algebraic sum of all the voltages in the signal circuit to control the motor, a second variable voltage device connected to the signal circuit in voltage opposition to the first variable voltage device, and means responsive to only the signal voltage of the above named voltages in the signal circuit to slowly control the second variable voltage device.

10. Electrical control apparatus comprising a signal circuit, means responsive to a condition to be controlled to produce a signal voltage in the circuit, a reversible motor adapted to operate a control device affecting the condition, a variable voltage device connected to the motor to be controlled thereby and connected to the signal circuit, means responsive to a voltage which is the algebraic sums of all the voltages in the signal circuit to control the motor, a second variable voltage device connected to the signal circuit in voltage opposition to the first variable voltage device, a second reversible motor connected to the second variable voltage device so as to slowly control it, and means responsive to only the signal voltage of the above named voltages in the circuit to control the second reversible motor.

11. An electric control system comprising a signal circuit, a plurality of variable voltage devices each having a movable member and each being connected to a source of voltage, each of said variable voltage devices having a voltage output which is dependent upon the position of the movable member thereof, means responsive to a condition to be controlled to adjust a first of said variable voltage devices, a reversible motor adapted to operate a control device affecting the condition, means for connecting said motor to the movable member of a second of said variable voltage devices to adjust the voltage output thereof in accordance with the position of said motor, manually operable means for adjusting a third of said variable voltage devices to vary the value of the condition which the system tends to maintain, a second reversible, slow operating, motor connected to the movable member of a fourth of said variable voltage devices, means for connecting the outputs of said first, second, third and fourth variable voltage devices into the signal circuit with the output of said fourth device in opposition to the output of said second device, so that the voltage output of said signal circuit is dependent upon the relative voltage outputs of said variable voltage devices, means responsive to the voltage output of said signal circuit to control said first named reversible motor in accordance with the voltage output of said signal circuit so that said first named motor operates said control device to a position depending upon the relative values of the output of said first, second, third and fourth variable voltage devices, and means controlled by said condition responsive means and responsive to the output of said third variable voltage device but not the outputs of said second and fourth devices for controlling said second reversible motor.

12. An electric control system comprising a signal circuit, a plurality of variable voltage devices each having a movable member and each being connected to a source of voltage, each of said variable voltage devices having a voltage output which is dependent upon the position of the movable member thereof, engine operating condition responsive means responsive to an actual engine operating condition to be controlled to adjust a first of said variable voltage devices, a reversible motor adapted to operate a control device affecting said engine operating condition, follow-up means for connecting said motor to the movable member of a second of said variable voltage devices to adjust the voltage output thereof in accordance with the position of said motor, manually operable engine operating condition selector means for adjusting a third of said variable voltage devices to select the value of the engine operating condition which the system tends to maintain, a second reversible, slow operating, motor connected to the movable member of a fourth of said variable voltage devices providing an output depending on the deviation between selected and actual engine operating conditions, means for connecting the outputs of said first, second, third and fourth variable voltage devices into said signal circuit with the output of said fourth device in opposition to the output of said second device so that the voltage output of said signal circuit is dependent upon the relative voltage outputs of said variable voltage devices, means responsive to the voltage output of said signal circuit to control said first named reversible motor in accordance with the voltage output of said signal circuit so that said first named motor operates said engine operating condition control device to a position depending upon the relative values of the outputs of said first, second, third and fourth variable voltage devices, and means controlled by said engine operating condition responsive means and responsive to the output of said third variable voltage device but not the outputs of said second and fourth devices for controlling said second reversible motor.

13. In engine control apparatus for controlling the operation of a combustion engine, a plurality of variable voltage devices each having a movable member and each being connected to its individual source of voltage, each of said variable voltage devices having a voltage output which is dependent upon the position of the movable member thereof, means responsive to an engine operating condition to be controlled to adjust a first of said variable voltage devices, fuel flow control means for controlling the flow of fuel to the engine, a reversible motor adapted to operate said fuel flow control means to regulate the operating condition of the engine, means for connecting said motor to the movable member of a second of said variable voltage devices to adjust the voltage output thereof in accordance with the position of said fuel flow control means, manually operable selector means for adjusting a third of said variable voltage devices to vary the value of the engine operating condition which the apparatus is to maintain, a second reversible, slow operating, motor connected to the movable member of a fourth of said variable voltage devices for providing a reset signal, a signal circuit, means for connecting the outputs of said first, second, third, and fourth variable voltage devices into said signal circuit with the output of said fourth device in opposition to the output of said second device so that the voltage output of said signal circuit is dependent upon the combined voltage output of said variable voltage devices, means responsive to the combined voltage output of said signal circuit to control said first reversible motor so that fuel flow to the engine is dependent upon the relative effects of the selected engine operating condition, the actual engine operating condition, relative position of the fuel flow control means, and the amount of reset, and means controlled by said means responsive to an engine operating condition and responsive to the output of said third variable voltage device but not the outputs of said second and fourth variable voltage devices for controlling said second reversible motor so that the amount of reset is adjusted.

14. An electric control system comprising a signal circuit, a plurality of variable voltage devices each having a movable member and each being connected to a source of voltage, each of said variable voltage devices having a voltage output which is dependent upon the position of the movable member thereof, means responsive to a condition to be controlled to adjust a first of said variable voltage devices, a reversible motor adapted to operate a control device affecting the condition, means for connecting said motor to the movable member of a second of said variable voltage devices to adjust the voltage output thereof in accordance with the position of said motor, manually operable means for adjusting a third of said variable voltage devices to vary the value of the condition which the system tends to maintain, a second reversible, slow operating, motor connected to the movable member of a fourth of said variable voltage devices, means for connecting the outputs of said first, second, third and fourth variable voltage devices into the signal circuit so that the voltage output of said signal circuit is dependent upon the relative voltage outputs of said variable voltage devices, means responsive to the voltage output of said signal circuit to control said first named reversible motor in accordance with the voltage output of said signal circuit so that said first named motor operates said control device to a position depending upon the relative values of the output of said first, second, third and fourth variable voltage devices, and means responsive to the outputs of said first and third variable voltage devices but not the outputs of said second and fourth devices for controlling said second reversible motor.

References Cited in the file of this patent

UNITED STATES PATENTS

| | | |
|---|---|---|
| 2,300,537 | Davis | Nov. 3, 1942 |
| 2,312,711 | Harrison | Mar. 2, 1943 |
| 2,313,079 | Lilja | Mar. 9, 1943 |
| 2,371,732 | Bristol | Mar. 20, 1945 |
| 2,376,199 | Shoults | May 15, 1945 |
| 2,376,513 | Shaffer | May 22, 1945 |
| 2,390,793 | Jones | Dec. 11, 1945 |
| 2,425,607 | Edwards et al. | Aug. 12, 1947 |
| 2,453,650 | Alexanderson | Nov. 9, 1948 |
| 2,462,796 | Wheeler | Feb. 22, 1949 |
| 2,476,063 | Ridgley et al. | July 12, 1949 |
| 2,491,380 | Kutzler | Dec. 13, 1949 |
| 2,498,101 | Wannamaker, Jr. | Feb. 21, 1950 |
| 2,509,295 | Glass | May 30, 1950 |
| 2,540,916 | Sparrow | Feb. 6, 1951 |